United States Patent [19]

Papir et al.

[11] Patent Number: 4,613,211

[45] Date of Patent: Sep. 23, 1986

[54] ELECTROCHROMIC DEVICES

[75] Inventors: Yoram S. Papir, Emeryville; Albert H. Schroeder, Richmond, both of Calif.

[73] Assignee: Chevron Research Company, San Francisco, Calif.

[21] Appl. No.: 554,153

[22] Filed: Nov. 21, 1983

[51] Int. Cl.$^4$ .............................................. G02F 1/23
[52] U.S. Cl. ....................................................... 350/357
[58] Field of Search ........................................... 350/357

[56] References Cited

U.S. PATENT DOCUMENTS

| | | | |
|---|---|---|---|
| 4,142,783 | 3/1979 | Engler et al. | 350/357 |
| 4,217,402 | 8/1980 | Rod et al. | 429/111 |
| 4,256,379 | 3/1981 | Green | 350/357 |
| 4,256,380 | 3/1981 | Barclay et al. | 350/357 |
| 4,256,383 | 3/1981 | Wessel et al. | 350/343 |
| 4,272,163 | 6/1981 | Samokhin et al. | 350/357 |
| 4,277,147 | 7/1981 | Arnoldussen | 350/357 |
| 4,278,329 | 7/1981 | Matsuhiro et al. | 350/357 |
| 4,297,005 | 10/1981 | Johnson, Jr. et al. | 350/357 |
| 4,303,310 | 12/1981 | Morita et al. | 350/357 |
| 4,304,465 | 12/1981 | Diaz | 350/357 |
| 4,502,934 | 3/1985 | Gazard et al. | 350/357 |
| 4,502,980 | 3/1985 | Denisevich, Jr. et al. | 252/500 |
| 4,505,840 | 3/1985 | Kurkov | 252/500 |
| 4,505,841 | 3/1985 | Denisevich, Jr. | 252/500 |
| 4,505,844 | 3/1985 | Denisevich, Jr. | 252/500 |
| 4,519,937 | 5/1985 | Papir | 252/500 |
| 4,519,938 | 5/1985 | Papir | 252/500 |

FOREIGN PATENT DOCUMENTS

| 93325 | 6/1982 | Japan | 350/357 |
|---|---|---|---|
| 2021277 | 11/1979 | United Kingdom | 350/357 |

OTHER PUBLICATIONS

"Electrochromic Display Rivals Liquid Crystal . . . " Electronics (Aug. 11, 1981).

Kaufman et al, "Polymer-Modified Electrodes: A New Class of Electrochromic Materials", App. Phys. Lett. 3-15-1980, pp. 422-425.

Engler et al, "Electrochromic Display Device with Memory Based on Homogeneous Doner Polymer Films", IBM Tech. Disc. Bull 12-1979, pp. 2943-2947.

Hirai et al, "Electrochromism for Organic Materials in Polymeric All-Solid-State Systems", App. Phys. Letts. 10-1-83, pp. 704-705.

*Primary Examiner*—William H. Punter
*Attorney, Agent, or Firm*—S. R. LaPaglia; E. J. Keeling; A. Stephen Zavell

[57] ABSTRACT

An electrochromic device which incorporates a reversibly color-changing organic polymer film as the display electrode. The display polymer film is capable of undergoing reversible oxidation and/or reduction to a charged, colored, conductive state. Upon reversing the charge, the polymer returns to its virgin color. The display films are comprised of linear fused heterocyclic ring systems, optionally with connecting units, or linear monocyclic ring systems and connecting units. The device requires low currents to operate and switch from the virgin state to the colored state. It also can optionally be operated to exhibit several colors.

21 Claims, 2 Drawing Figures

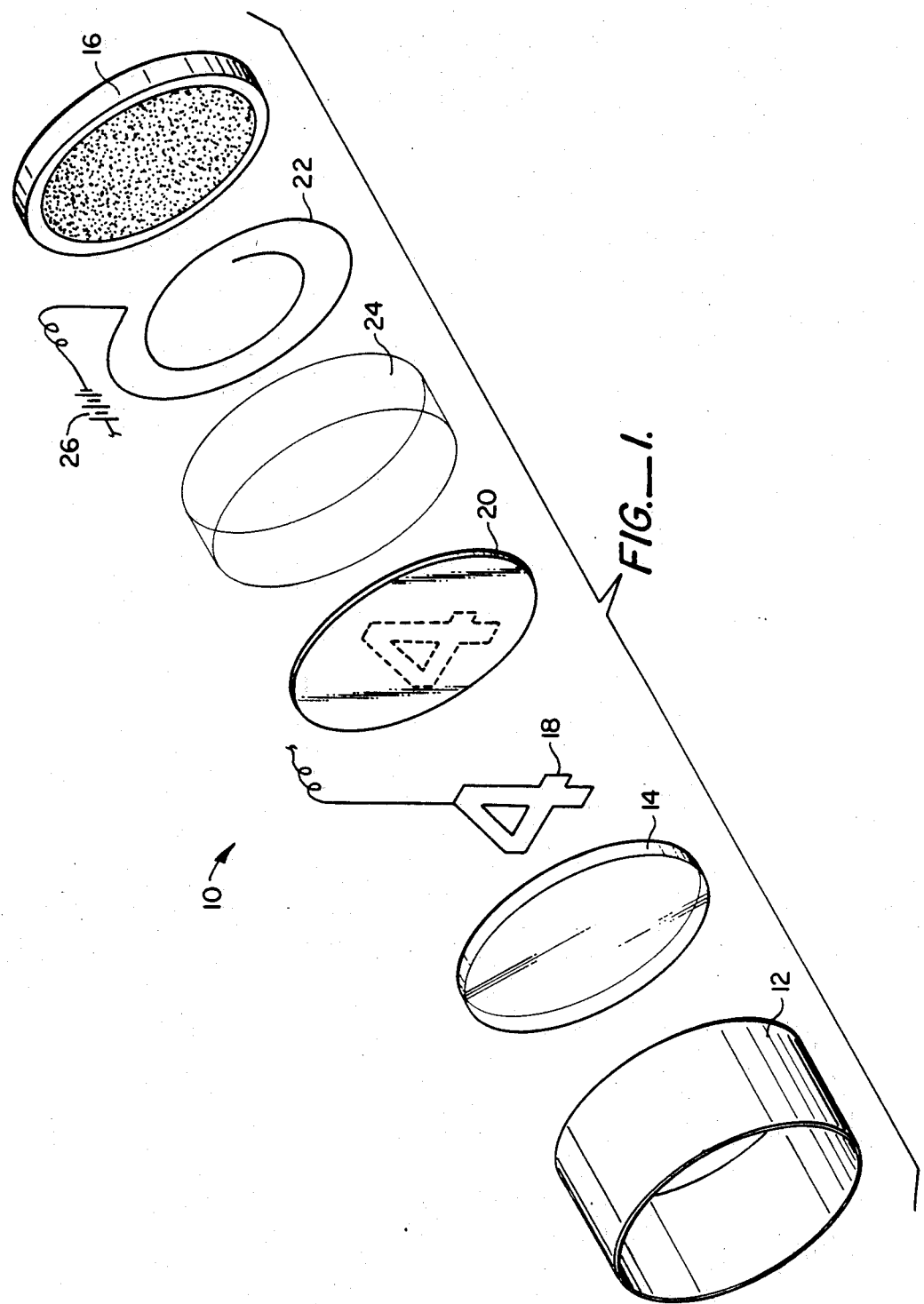
FIG._1.

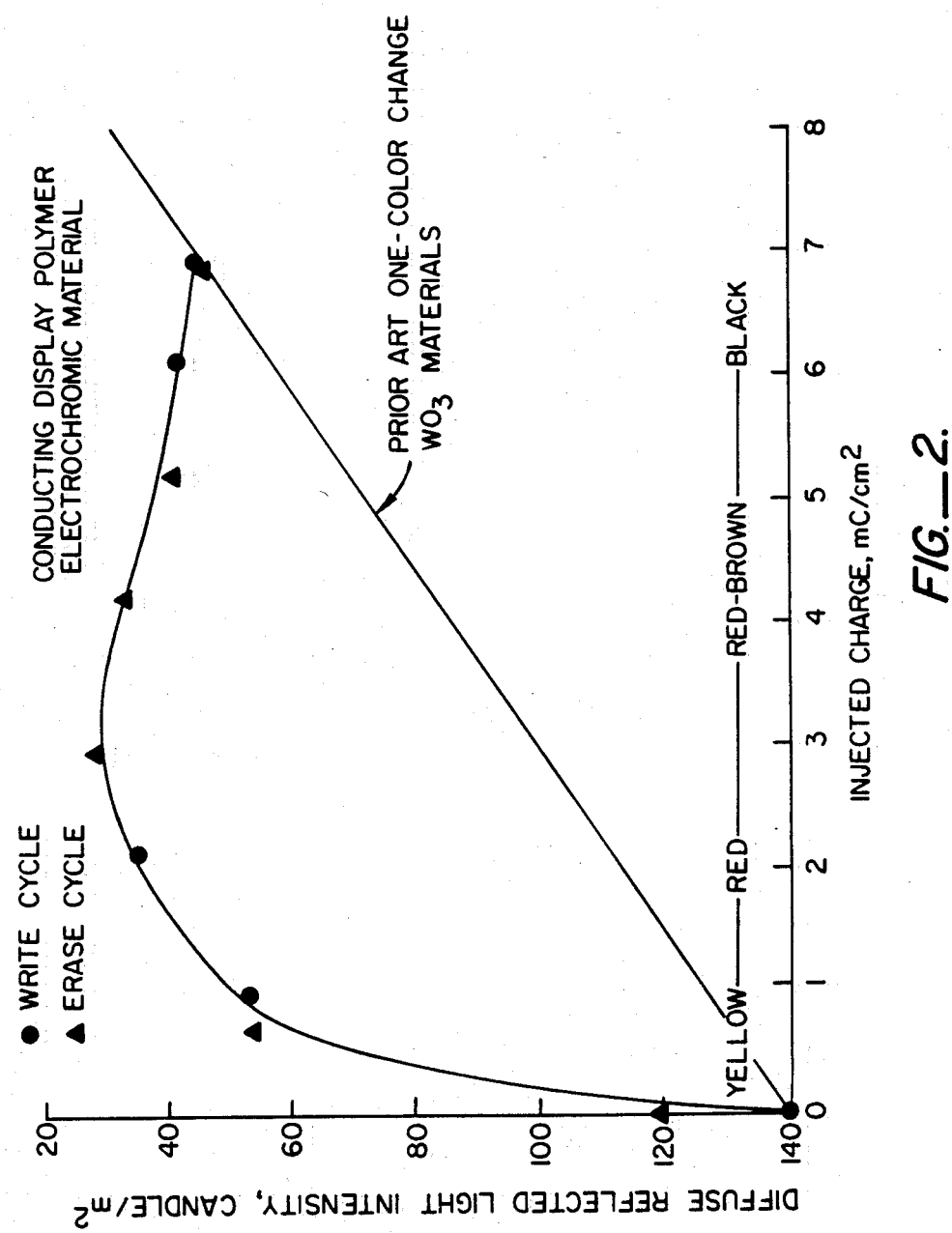
FIG._2.

ELECTROCHROMIC DEVICES

BACKGROUND OF THE INVENTION

This invention relates to display devices. More specifically, this invention relates to electrochromic display devices which incorporate tractable, stable, conductive polymers as the display material.

Electrochromic devices are display devices which incorporate materials having a persistent but easily reversible color change. Such changes are effected in the material by an applied electric current. The original color is regained upon reversing this process. Good electrochromic display devices hold their color and charge in an open circuit situation.

These reversible color changes can be accomplished with either of two broad categories of solid: the non-polymeric type and the polymeric type. Included in the non-polymeric type are the metal oxides such as lithium salts of tungsten trioxide, iridium oxide, and the like. Another type of non-polymeric material is the small organic molecules capable of undergoing electrically produced reversible oxidation/reduction reactions in which the two states have different colors, e.g., viologen compounds and the like. A third type of non-polymeric electrochromism is the electrically induced deposition or dissolution of a thin film of a metal, e.g., silver. Such devices have a high power requirement and are slow to write and erase.

The polymeric electrochromic displays include those in which electrochromic groups are bound to a backbone polymer such as polystyrene. They are similar to the non-polymeric devices in that they require high power and are slow to write and erase. The other polymeric electrochromic displays are those in which the polymer contains monocyclic heterocyclic rings in the polymer backbone such as polypyrrole or polythiophene. These latter two types are fast to write and erase and need only lower power to charge and discharge. However, these electrochromic polymers are intractable and difficult to fabricate. It is difficult to synthesize and control the morphology of polypyrroles and polythiophenes. The result is a polymer which at high molecular weights cannot be fabricated, and at low, solvent soluble molecular weights has poor solid characteristics.

Thus, it would be highly desirable to have an electrochromic display material which is tractable and easy to work with and fabricate in any desired shape. In addition, it is also desirable to have a device which requires low power and possesses a fast write/erase speed. It would also be desirable for the displays to be multicolor processable.

SUMMARY OF THE INVENTION

We have invented an electrochromic display device incorporating at least one electroactive, organic polymer display electrode which possesses the desirable properties previously recited. The display electrode(s) incorporated into the device in their simplest form comprise a transparent conductive electrode such as indium tin oxide or any other transparent electrical conductor and a linear tractable color-changing electroactive polymer contacting the transparent conductive oxide. The device also includes a case having at least one transparent face, a counter electrode spaced apart from the display electrode, and a solvent incorporating suitable ionic dopants dissolved in the solvent contained between the electrodes, and a means for applying a charge to the device electrodes. The solvent and ionic dopants form an electrolyte solution.

The linear display polymer is capable of undergoing a reversible oxidation or a reversible reduction or both to a charged, colored, conductive state. In general, the class of polymers of the present invention are near colorless or pale transparent yellow in their uncharged, virgin state. This color changes to orange, to red, to dark blue or brown, to black, depending upon the degree of charging. The color changes occur rapidly, i.e., on the order of less than 0.1 second and the required charge for a 4–5:1 contrast ratio is on the order of only about 1–3 $mC/cm^2$. The polymers exhibit considerable stability in the charged, colored, conductive state. A display electroactive polymer is defined as a polymer having a conductivity and color which has been modified with electron acceptor or electron donor dopants to a greater conductivity and different color than the virgin or unmodified state of the polymer.

The linear display polymer comprises diradical repeat units selected from the group consisting of a heterocyclic ring system including at least one Group 5B or Group 6B atom (IUPAC), wherein none of the ring carbon atoms are saturated, a heterocyclic ring system including at least one Group 5B or 6B atom wherein none of the ring carbon atoms is saturated and a connecting unit, and mixtures thereof, wherein said diradical repeat unit in the form of a monomeric repeat unit is capable of undergoing reversible oxidation or reversible reduction or both to form a stable ionic species and wherein said connecting unit is a conjugated system or atom or group of atoms which maintain the $\pi$-orbital overlap with the heterocyclic ring system.

A diradical repeat unit is defined as the smallest structural building block of the polymer backbone having two unsatisfied positions available for linking. These are utilized to propagate the backbone. The diradical repeat units are selected from the group consisting of a heterocyclic ring system, a heterocyclic ring system and a connecting unit, or mixtures thereof. The heterocyclic ring systems include at least one Group 5B or 6B atom (IUPAC System). None of the ring carbon atoms in the heterocyclic ring system are saturated. More specifically, the heteroatoms are selected from the group consisting of N, P, As, Sb, and Bi for the Group 5B atoms and O, S, Se, and Te for the Group 6B atoms. N, O, S are the preferred heteroatoms.

The heteroatoms are distributed among the ring system such that when the ring system is comprised of fused rings, the heteroatoms do not occupy the ring fusion positions. Furthermore, when more than one heteroatom is selected for a mono or fused heterocyclic system, no two heteroatoms can be adjacent to one another unless the heteroatoms are both nitrogen in which case no more than two adjacent nitrogens are permitted.

A monomeric repeat unit is defined as a diradical repeat unit wherein the unsatisfied positions are substituted by hydrogen atoms. The monomeric repeat unit must be capable of undergoing reversible oxidation or reversible reduction to a stable ionic species. A stable ionic species is defined as a charged atomic or molecular species in the condensed phase which maintains its chemical integrity throughout the course of the chemical process of interest.

A connecting unit is defined as any atom or group of atoms which can link the heterocyclic ring systems together into a polymer chain without adversely effecting the reversible oxidation or reversible reduction and color changes of the polymer. The connecting unit must be conjugated or maintain the $\pi$-orbital overlap with the heterocyclic ring system.

The tractable virgin polymers undergo their color changes by subjecting them to reversible electrochemical oxidation or reversible electrochemical reduction reactions. This is accomplished by contacting the virgin polymer in a suitable electrolyte solution and using it as the display electrode of the device. It is preferred that the electrolyte solution swell the polymer matrix. Upon passing of an electric current through such a cell, the polymer becomes either partially or fully reduced or oxidized (depending upon the direction of current flow) and charge-compensating cationic or anionic dopants from the supporting electrolyte become incorporated into the polymer. The resulting electroactive polymer undergoes a color change and consists of a charged, colored polymer backbone incorporating charge-compensating ionic dopants. The charges of the polymer and the charge-compensating ionic dopants balance so that the colored electroactive polymer is electrically neutral. Furthermore, the electrochemical oxidation or reduction proceeds solely by an electron transfer. The charge-compensating anions or cations are associated with the charged polymer backbone but do not chemically react with or modify said backbone.

Polymers which are reversibly reduceable are known as n-type polymers. These are especially suited for use as anode display electrodes. An n-type electroactive organic polymer of this invention is obtained by electrochemically reducing the virgin polymer to a polyanion and incorporating into it charge-neutralizing cations. Polymers which are reversibly oxidizable are known as p-type polymers. These are especially suited for use as cathode display electrodes. A p-type electroactive organic polymer is obtained by electrochemically oxidizing the virgin polymer to a polycation and incorporating into it charge-neutralizing anions. Of course, the display device can include both p-type and n-type color-changing display polymers to expand the variety of colors available. In addition, two or more n-type or p-type color-changing display polymers can also be used. However, for the vast majority of device applications, only a single color-changing polymer electrode will be used with a suitable counter electrode.

The polymers as display electrodes are stable in their electroactive or charged states because they are composed of diradical repeat units whose monomeric repeat units form stable cations and anions, respectively, upon electrochemical oxidation or reduction. This imparts electrical stability to the device which is fabricated therefrom.

The electrodes can be closely spaced and fabricated as thin films because the polymers retain their structural and dimensional integrity during the charging and discharging cycles. The polymer display electrodes require only sufficient electrolyte solution to swell the polymers enough so that the diffusion of charge-compensating ionic dopants into and out of the polymer matrix is sufficiently high to sustain a reasonable charge and color change rate. The electrolyte ions can be present largely in the solid state as a slurry in a minimal volume of a saturated electrolyte solution between the two electrodes.

BRIEF DESCRIPTION OF THE DRAWING

FIG. 1 illustrates an exploded view of an electrochromic display device of our invention.

FIG. 2 illustrates the color intensity and multiple color changes versus injected charge for a poly-2,6-(4-phenylquinoline) display polymer electrode in an electrochromic device of our invention.

DETAILED DESCRIPTION OF THE INVENTION

An exploded view of a suitable display device is illustrated as device 10 in FIG. 1. Device 10 has a case 12 which includes a transparent cover 14 of glass or other suitable material and a light-colored back cover 16 of white plastic, frosted glass or other suitable light-colored material capable of highlighting the display colors in the polymer during the write cycle. The covers 14 and 16 are on the opposed ends of the case 12 and form the sealed device 10 into which all the additional components fit therebetween. The device 10 has a transparent conductive electrode (TCE) 18 of indium tin oxide, tin oxide, transparent gold or platinum films, and the like. The TCE 18 is configured in the shape of the desired display when the electrode is biased to oxidizing or reducing conditions. Typically, the TCE 18 is applied to the transparent cover 14, although it can be applied to its own transparent support, not illustrated. The display polymer electrode film 20 contacts the TCE 18. Although the film 20 can be as large as the support for the TCE 18, a sharper image is obtained when the film 20 has the same shape as the TCE 18. A suitable film 20 is poly-2,6-(4-phenylquinoline). Other species of suitable display polymers are described hereinafter. Spaced apart from the TCE 18 and film 20 is a counter electrode 22. A suitable counter electrode material is platinum, gold, and like materials which complete the circuit and do not react with the display electrode combination. Another example of a suitable counter electrode 22 is a silver wire coated with a layer of a silver halide complex such as silver chloride or silver bromide. Between the electrodes 18/20 and 22 is an electrolyte solution 24. If a larger contrast or wider variety of colors is desired, the counter electrode can optionally be a display type polymer of opposite conductivity to the conductivity of the display polymer used for 20, i.e., if polymer 20 were n-type, then a counter electrode polymer would be p-type. The electrolyte solution 24 comprises a solvent such as acetonitrile, propylene carbonate, tetrahydrofuran, propionitrile, butyronitrile, phenylacetonitrile, dimethylformamide, dimethoxyethane, dimethylsulfoxide, pyridine, or mixtures thereof, and the like. Any gelling agents known in the art which are suitable for increasing the viscosity of the supporting electrolyte without inhibiting the dissociation of the supporting electrolyte or movement of ions therethrough are suitable, for example, starch, guar gum, and the like. Acetonitrile is a preferred solvent. Any solvent which does not dissolve the electrodes or case is suitable. Dissolved in the solvent to make up the electrolyte solution 24 is an anion-cation pair. Suitable electrolyte cations are selected from cations such as $Li^+$, $Na^+$, $K^+$, $Cs^+$, $Mg^{++}$, $(CH_3)_4N^+$, $(C_2H_5)_4N^+$, $(C_3H_7)_4N^+$, and $(C_4H_9)_4N^+$, and the like, as disclosed in U.S. application Ser. No. 442,531 now U.S. Pat. No. 4,519,938. The cation can be any cation, the salt of which can be dissolved in the solvent and will not adversely react with the electrode materials. Suitable electrolyte anions can be F⁻, C⁻, Br⁻, ClO₄⁻, BF₄⁻, NO₃⁻, PF₆⁻, AsF₆⁻, and the like. Mixtures of salts can be employed. An example of a suitable combination is NaCl or tetrabutylammonium-tetrafluoroborate. The latter is a preferred anion-cation pair. The device 10 is completed with a means for applying a voltage across and sufficient current to electrodes 18/20 and 22 to change the color of the display film 20. A suitable means 26 is a battery having sufficient current and voltage to drive the device. If the display film 20 is an n-type polymer, then the means 26 is connected between the electrodes so that reducing conditions are created at the electrode 18/20. If the display polymer 20 is a p-type polymer, then the means 26 is connected between the electrodes so that oxidizing conditions are created at the electrode 18/20. Of course, reversing the conditions erases the color of the film and returns it to its virgin color. If the polymer is capable of operating as either an n-type or p-type polymer, then the means 26 can be connected to create oxidizing or reducing conditions at the electrode 18/20.

An example of the color changes and the write/erase cycle for a device of our invention is illustrated in FIG. 2. The write/erase cycle is for a poly-2,6-(4-phenyl-quinoline)/indium tin oxide display electrode with a platinum counter electrode, and acetonitrile solvent and tetrabutylammonium-tetrafluoroborate anion-cation pair. FIG. 2 illustrates a three-color change over the range of operation and a completely reversible display characteristic. In addition, it shows the rapid initial color change from yellow to red. This property can be usefully used as a fast switch with a color change to indicate the switching effect. After the initial color change, the flatter part of the curve permits the additional and more uniform color change to be achieved by injecting more charge. This characteristic permits the desired color to be easily selected. This property makes the devices ideal for indicators as well as display devices.

Having described the general device, the class of suitable polymers is described more particularly hereinafter. The tractable electroactive unsaturated heterocyclic ring system polymers capable of incorporating ionic conductivity modifiers and the electrochemical modification of the polymer are taught in U.S. application Ser. No. 442,531, now U.S. Pat. No. 4,519,938 filed Nov. 17, 1982 and completely incorporated herein by reference. Their use in batteries is taught in U.S. application Ser. No. 448,585, filed Dec. 15, 1982 and completely incorporated herein by reference. We have discovered that these polymers are useful as display materials in electrochromic devices of this invention.

Preferred diradical units forming said linear polymer backbone for the display polymer for the display electrode are described hereinafter. Suitable fused 6,6,6-membered ring system polymers are fabricated with the diradicals of thianthrenes, phenoxathiins, phenoxazine, N-alkylphenothiazine dihydrophenazine, dialkyldihydrophenazine, dibenzodioxin, their substituted derivatives and mixtures thereof. The diradicals are connected through the outer carbocyclic rings or a carbocyclic ring and a nitrogen in the central ring. Preferably the diradicals are interspersed with connecting units such as phenylene, vinylene, dithiophenylene and 2,5-(1,3,4-oxadiazolediyl). More specifically, polymers such as poly-2,5-phenoxazine, poly-2,5-(3,7-dimethyl)phenoxazine, poly-2,5-(1,4-phenylene)phenoxazine, poly-3,7-(N-methylphenothiazine)-2,5-(1,3,4-oxadiazole), poly-3,7-(phenoxathiin-4,4'-dithiobiphenylene), and poly-(1,4-dithiophenylene-2,6-thianthrene). These polymers are preferably p-type, i.e., the polymers capable of undergoing reversible oxidation, and are preferred materials for use as cathodes of this invention. For example, see U.S. applications Ser. Nos. 442,400 and 442,393, now U.S. Pat. Nos. 4,505,844 and 4,505,841, both filed Nov. 17, 1982 and completely incorporated herein by reference.

Suitable fused 5,6-membered ring system polymers are fabricated with the diradicals of benzoxazole, benzothiazole, benzoselenazole, N-alkyl-substituted benzimidazole, their substituted derivatives, and the like. Particular examples are poly-2,2'-(p-phenylene)-1,1'-dimethyl-5,5'-bibenzimidazole, poly-2,2'-(p-phenylene)-5,5-bibenzoxazole, and poly-2,2'-(p-phenylene)-5,5'-bibenzothiazole. The polymers are capable of undergoing reversible reduction and thus form stable n-type polymers. These polymers are preferred for use as anode materials of this invention. Particularly preferred polymers are poly-2,2'-(p-phenylene-6,6'-bibenzoxazole), poly-2,2'-(p-phenylene)-1,1'-dimethyl-6,6'-bibenzimidazole, and poly-2,2'-(p-phenylene)-6,6'-bibenzothiazole. These polymers are capable of undergoing a reversible oxidation and reversible reduction, i.e., n-type and p-type characteristics. These polymers are especially preferred for use as either anode materials (i.e., when said polymer is n-type) or cathode materials (i.e., when said polymer is p-type) of this invention. Other preferred polymers are poly-(2,2'-(m-phenylene)-6,6'-bibenzoxazole, poly-2,2'-(m-phenylene)-1,1'-dimethyl-6,6'-bibenzimidazole, poly-2,2'-(m-phenylene)-6,6'-(bibenzthiazole, and poly-2,2'-(N-methyl-p,p'-aminodiphenylene)-6,6'-bibenzoxazole. These polymers are capable of undergoing reversible oxidation and thus form a stable n-type polymer. These polymers are preferred for use as cathode materials of this invention. For example, see U.S. application Ser. No. 442,392, now U.S. Pat. No. 4,505,840 filed Nov. 17, 1982 and completely incorporated herein by reference.

Suitable 5,6,5-membered ring system polymers are fabricated with the diradicals of 1,7-dialkyl-benzo[1,2-d:4,5'd']diimidazoles, such as 1,7-dimethyl-benzo[1,2,-d:4,5-d']diimidazole; benzo[1,2-d:5,4-d']bisthiazole; benzo[1,2-d:4,5-d']bisthiazole; benzo[1,2-d:5,4-d']bis-selenazole; benzo[1,2-d:4,5-d']bisselenazole; benzo[1,2-d:4,5-d']bistellurazole; selenazolo[5,4-f]benzothiazole; 1,8-dialkyl-benzo[1,2-d:3,4-d']diimidazoles, such as 1,8-dialkyl-benzo[1,2-d:3,4-d']diimidazole; benzo[1,2-d:5,4-d']bisoxazole; benzo[1,2-d:4,5-d']bisoxazole; benzo[1,2-d:3,4-d']bisoxazole; benzo[1,2-d:3,4-d']bisthiazole; their substituted derivatives; and mixtures thereof. For example, poly-2,6-(p-phenylene)-benzo[1,2-d:5,4d']bisoxazole, poly-2,6-(p-phenylene)-1,7-dimethyl-benzo[1,2-d:4,5d]diimidazole, poly-2,6-(p-phenylene)-benzo[1,2-d:4,5-d']bisthiazole, and poly-2,6-(m-phenylene)-benzo[1,2-d:4,5-d']bisthiazole. Preferred polymers exhibit n-type properties. For example, see U.S. application Ser. No. 442,394, now U.S. Pat. No. 4,522,745, filed Nov. 17, 1982 and completely incorporated herein by reference.

Suitable monocyclic heterocyclic ring system polymers are comprised from recurring diradicals of triazoles, heterodiazoles such as thiadiazole, oxadiazole, and the like, and heteroazoles such as oxazole and thiazole, all said monocyclic heterocyclic systems incorporating 1,4-phenylene as a connecting unit. Optionally these systems may incorporate other preferred connecting units. Suitable polymers are poly-1,4-phenylene-2,5-(1,3,4-oxadizaole), copolymer of oxadiazole and thiadiazole, poly-1,4-phenylene-2,5-(1,3,4-thiadiazole), poly-4,4'-N-methylaminodiphenylene-2,5-(1,3,4-oxadiazole), poly-1,4-phenylene-2,4-(1,3-thiazole), poly-1,4-phenylene-2,5-(1-phenyl-1,3,4-triazole), and poly-1,4-phenylene-2,5-(1,4-dithiin). Preferred polymers exhibit n-type characteristics. These polymers are preferred for use as anode materials of this invention. For example, see U.S. application Ser. Nos. 442,396; 442,397; 442,398; and 442,399; all filed Nov. 17, 1982, now U.S. Pat. Nos. 4,502,980, 4,505,842, 4,519,940 and 4,505,843; and completely incorporated herein by reference. With the monocyclic systems, only those compounds whose corresponding monomeric repeat units are able to undergo reversible reduction or reversible oxidation to a stable ionic species are within the scope of the invention. Of course, any of the above mono or fused heterocyclic systems can be substituted with one or more substituents as long as the ring carbon atoms remain unsaturated.

For example, suitable polymers are composed of recurring diradical units of fused, 6,6-membered, nitrogen-containing, heterocyclic ring systems. The fused rings contains from 1 through 6 nitrogen atoms and preferably 1–4 nitrogen atoms. The nitrogen atoms are distributed between the fused rings with 2 or less nitrogens bonded sequentially in a ring and none of the nitrogens occupying the ring fusion positions. These polymers exhibit n-type characteristics and are preferred for use as anode materials of this invention. Suitable polymers were disclosed in previously filed applications, U.S. applications Ser. No. 264,915, filed May 18, 1981, and now abandoned and Ser. No. 304,410, filed Sept. 21, 1981, and now abandoned and Ser. No. 370,231, filed Apr. 22, 1982 and now U.S. Pat. No. 4,519,937. All of the teachings and disclosures of said applications are to be completely and for all purposes incorporated herein by reference.

Suitable examples of single-nitrogen, fused-ring systems are any of the diradicals of quinoline and isoquinoline. Preferred quinoline polymers exhibit n-type conductivity. Suitable examples of two-nitrogen, fused-ring systems are any of the diradicals of cinnoline; quinazoline; quinoline; 2-phenylquinoxaline; phthalazine; 1,5-napthyridine; 1,6-naphthyridine; 1,7-naphthyridine; 1,8-naphthyridine; 2,6-naphthyridine; copyrine; and the like. Suitable examples of three-nitrogen, fused-ring systems are any of the diradicals of 1,2,4-benzotriazine; pyrido[3,2-d]pyrimidine; pyrido[4,3-d]pyrimidine; pyrido[3,4-d]pyrimidine; pyrido[2,3-d]pyrimidine; pyrido[2,3-b]pyrazine; pyrido[3,4-b]pyrazine; pyrido[(2,3-d]pyridazine; pyrido[3,4-d]pyridazine; and the like. Suitable examples of four-nitrogen, fused-ring systems are any of the diradicals of pyridazino[4,5-c]pyridazine; pyrimido[5,4-d]pyrimidine; pteridine; pyrimido[4,5-d]pyridazine; pyrimido[4,5-d]pyrimidine; pyrazino[2,3-b]pyrazine; pyrazino[2,3-d]pyridazine; pyridazino[4,5-d]pyridazine; pyrimido[4,5-c]pyridazine; pyrazino[2,3-c]pyridazine; pyrido[3,2-d]-astriazine; pyrido[2,3-e]-astriazine; and the like. Suitable examples of five-nitrogen, fused-ring systems are any of the diradicals of pyrimido[4,5-e]-as-triazine; pyrimido[5,4-d]-as-triazine; and the like. Suitable examples of six-nitrogen, fused-ring systems are any of the diradicals of as-triazino[6,5-d]-as-triazine; and the like. All the previously mentioned fused, nitrogen-ring systems are known and disclosed in *The Ring Index*, 2nd Edition, and *Supplements I, II and III*, Patterson et al, American Chemical Society. These polymers are preferred for use as anode materials of this invention. The molecules are synthesized into polymers by methods known in the art such as treatment with $ZnCl_2$ or $FeCl_3$ and an alkyliodide, or by dichlorination followed by reaction with appropriately disubstituted molecules such as: disodium sulfide, disodium salt of ethylene glycol, and the like.

The diradicals can be modified with substituents such as electron donating or withdrawing groups by methods known in the art which modify the polymer properties. The diradicals can also be separated by one or more connecting units. Preferred connecting units are phenylene, biphenylene, vinylene, and

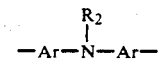

wherein Ar is phenylene or biphenylene and $R_2$ is lower alkyl $C_1$–$C_4$.

Suitable polymers in which the nitrogens of the diradicals are in the ionic form include N-alkyl quinolinium and the like for the above compounds.

The electroactive polymers of the invention have the following formula:

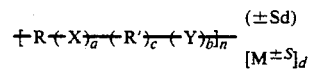

where a is either 0 or 1; b is either 0 or 1; c is either 0 or 1; n is an integer between 1 and 20,000; d is an integer between 1 and 40,000; s is an integer 1, 2, or 3; R is either an unsubstituted or substituted heterocyclic diradical ring system; R' is an identical diradical ring system or different diradical ring system from R; X is a connecting unit comprised of a single atom, or a group of atoms; Y is a connecting unit which is identical to or different from X; and M is an atom or a group of atoms acting as a charge-compensating ion whose electrical charge is opposite to the charge exhibited by the recurring repeat unit:

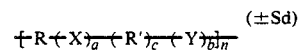

The repeat units form the polyanion or polycation of the electroactive polymer.

The diradical R group is a substituted or unsubstituted heterocyclic systems previously recited. For example, quinoline, isoquinoline, substituted derivatives, or mixtures thereof are preferred. For the substituted derivatives see U.S. application Ser. No. 370,231. Preferred quinoline polymers have the diradicals connected at the 2,6 and 3,6 positions. Substitution in the 4 position is preferred such as poly-2,6-(4-phenylquinoline). In addition, the substituents can be further substituted to modify the polymer properties, e.g., poly-2,6-[4-(4'-chlorophenyl)quinoline]; poly-2,6-[4-(4'-methoxyphenyl)quinoline]; and other halogenated alkyl and alkoxy derivatives. Another preferred polymer is composed of quinoxaline units, substituted quinoxaline, or mixtures thereof.

Optionally, the diradicals can be separated by one or more X or Y connecting units which are an atom or group of atoms capable of linking the diradicals into the polymer chain.

Other connecting units X and Y can be selected from the group comprising:

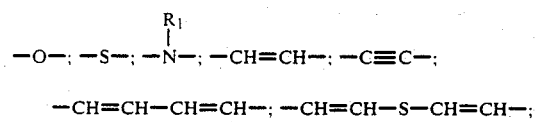

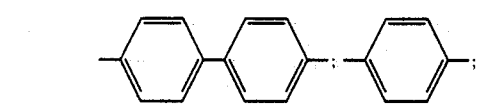

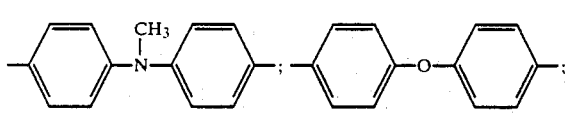

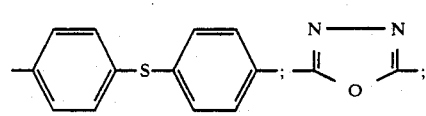

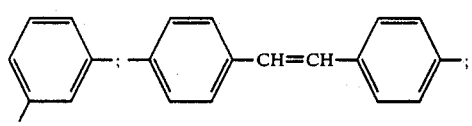

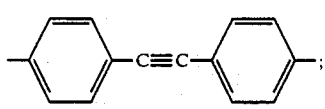

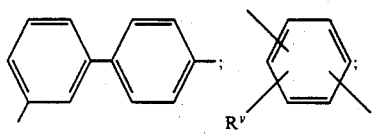

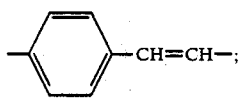

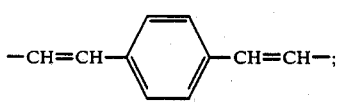

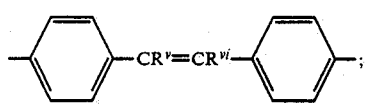

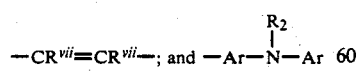

wherein $R_1$ is lower alkyl $C_1$-$C_6$, aryl, and cycloalkyl, and $R^v$, $R^{vi}$ and $R^{vii}$ are H or methyl, methoxy, halogen and mixtures thereof; $R_2$ is lower alkyl $C_1$-$C_4$ and p-substituted phenyl; and Ar is phenylene or biphenylene.

Other suitable connecting units are disclosed above and in previously recited applications. Preferably, the connecting units are phenylene, —O—, —S—, biphenylene, —CH=CH—, and

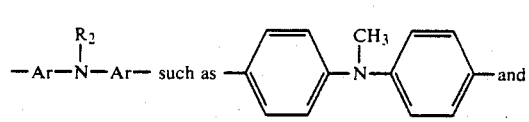

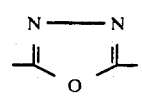

The following structures represent preferred electroactive n-type polymers which are substituted and/or incorporated connecting units and are of the general formula:

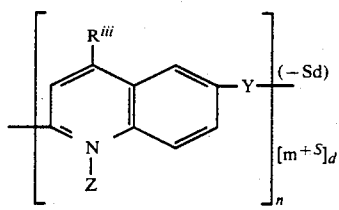

wherein $R^{iii}$ is a substituent as taught in U.S. application Ser. No. 370,231; Y is a connecting unit; and Z is nothing or an alkyl $C_1$-$C_4$ group.

These are preferred for use as display materials of this invention which are reduced to create the color change. The "n" in the preferred polymer structures below stands for the degree of polymerization.

A preferred polymer is poly-2,6-(4-phenylquinoline) and has the formula:

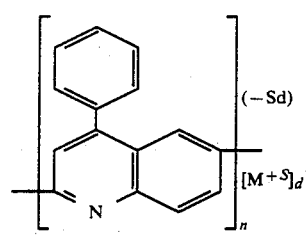

A preferred polymer has the formula:

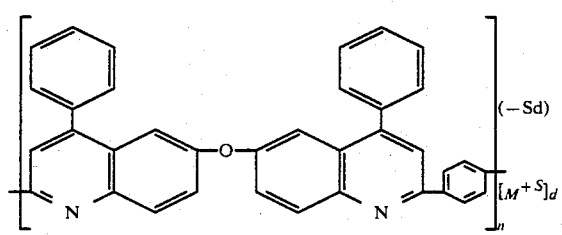

Another preferred polymer has the formula:

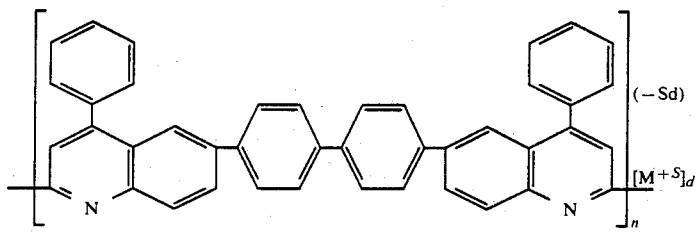

Another preferred polymer has the formula:

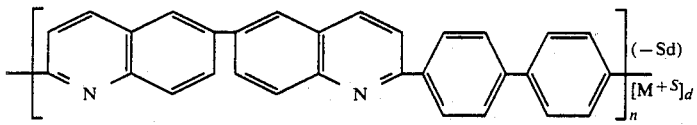

Another preferred polymer has the formula:

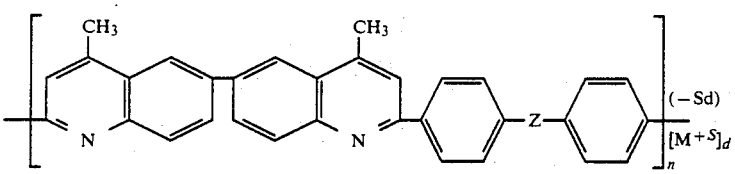

wherein Z is a connecting unit.
Another preferred polymer has the formula:

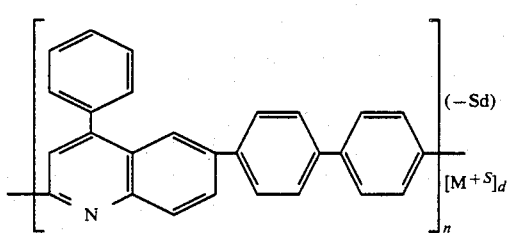

Another preferred polymer is obtained when R and R' are quinoline diradicals with a substituent group $R^{ii}$ in the 4 position and $R^{vii}$ is methyl or H and the polymer has the formula:

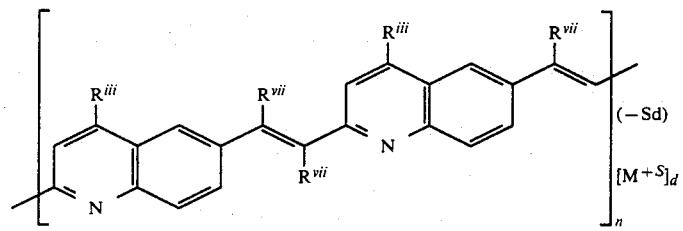

Still another preferred polymer is when $R^{iii}$ is phenyl and $R^{vii}$ is H.

A preferred polymer of poly(phenylquinoxaline) has the formula:

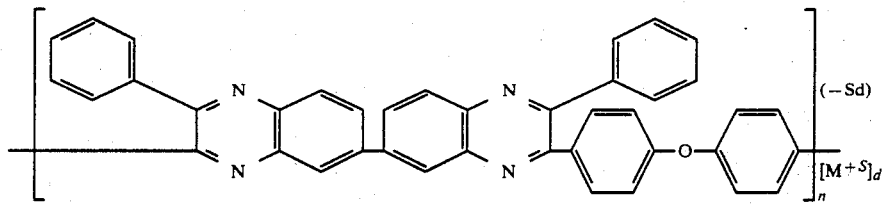

The use of the previously recited heterocyclic polymers in the construction of the display electrode represents a significant improvement in the electrochemical stability of the resulting device over that attained with polypyrrole and other polymer materials reported to date. The distinguishing feature of polymers of this invention which provides for this improvement is the fact that they are composed of diradical repeat units, whose corresponding monomeric repeat units form stable cations or anions, respectively, upon reversible electrochemical oxidation or reduction. As a result of the electrochemical stability, our device can undergo repeated cycling. Furthermore, our device exhibits a high color change rate and low power requirements. The device is not limited to the construction illustrated in the Figure. The device may be fabricated in a square or rectangular shape.

Having described the electrolytes, the device and the methods of fabrication of the device, modification which would be obvious to one of ordinary skill in the art is contemplated to be within the scope of the invention.

What is claimed is:

1. An electrochromic device comprising:
   a case, said case has a transparent face and a face opposite thereto which is capable of highlighting the display colors of the device during the write cycle;
   a display electrode within said case and adjacent said transparent face, said display electrode comprises a transparent conductive electrode and a display polymer film attached thereto, said display polymer film comprises a linear tractable electroactive polymer, said polymer is capable of undergoing reversible oxidation, reversible reduction or both to form a linear charged, colored polymer incorporating charge-compensating ionic dopants, said polymer comprises diradical repeat units selected from the group consisting of a heterocyclic ring system including at least one Group 5B or Group 6B atom, wherein none of the ring carbon atoms are saturated, a heterocyclic ring system including at least one Group 5B or Group 6B atom wherein none of the ring carbon atoms are saturated and a connecting unit, and mixtures thereof, wherein said diradical repeat unit in the form of a monomeric repeat unit is capable of undergoing reversible oxidation, reversible reduction or both to form a stable ionic species and wherein said connecting unit is a conjugated system or atom or group of atoms which maintain $\pi$-orbital overlap with the heterocyclic ring system;
   a counter electrode adjacent to said light-colored face;
   an electrolyte; and
   means for applying a voltage and current to said display electrode and said counter electrode.

2. The electrochromic device according to claim 1 wherein said display polymer Group 5B or 6B heteroatom is selected from the group consisting of N, P, As, O, S, Se, Te or mixtures thereof and none of the heteroatoms occupies the ring fusion positions and the P, As, O, S, Se, Te atoms do not occupy adjacent ring positions.

3. The electrochromic device according to claim 2 wherein said heteratom is selected from the group consisting of N, S, O, or mixtures thereof.

4. The electrochromic device according to claim 3 wherein the heteroatoms are nitrogen and no more than two nitrogen atoms are bonded sequentially within the heterocyclic ring system.

5. The electrochromic device according to claim 3 wherein the diradicals are positional diradicals selected from the group consisting of thianthrenes; phenoxathiins; phenoxazine; N-alkyphenothiazine; dihydrophenazine; dialkyldihydrophenazine; dibenzodioxin; benzoxazole; benzothiazole; benzoselenazole; N-alkyl-substituted benzimidazole; 1,7-dimethyl-benzo[1,2,-d:4,5-d']diimidazole; benzo[1,2-d:5,4-d']bisthiazole; benzo[1,2-d:4,5-d']bisthiazole; benzo[1,2-d:4,5-d']bisselenazole; benzo[1,2-d:5,4-d']bis-selenazole; benzo[1,2-d:4,5-d']bistellurazole; selenazole[5,4-f]benzothiazole; 1,8-dialkyl-benzo[1,2-d:3,4-d']diimidazole; benzo[1,2-d:5,4-d']bisoxazole; benzo[1,2-d:4,5-d']bisoxazole; benzo[1,2-d:3,4-d']bisoxazole; benzo[1,2-d:3,4-d']bisthiazole; triazole and 1,4-phenylene; thiadiazole and 1,4-phenylene; oxadiazole and 1,4-phenylene; oxazole and 1,4-phenylene; thiazole and 1,4-phenylene; cinnoline; quinazoline; quinoxaline; 2-phenylquinoxaline; 4-phenylquinoline; phthalazine; 1,5-naphthyridine; 1,6-naphthyridine; 1,7-naphthyridine; 1,8-naphthyridine; 2,6-naphthyridine; copyrine; 1,2,4-benzotriazine; pyrido[3,2-d]pyrimidine; pyrido[4,3-d]pyrimidine; pyrido[3,4-d]pyrimidine; pyrido[2,3-d]pyrimidine; pyrido[2,3-b]pyrazine; pyrido[3,4-b]pyrazine; pyrido[2,3-d]pyridazine; pyrido[3,4-d]pyridazine; pyridazino[4,5-c]pyridazine; pyrimido[5,4-d]pyrimidine; pteridine; pyrimido[4,5-d]pyridazine; pyrimido[4,5-d]pyrimidine; pyrazino[2,3-b]pyrazine; pyrazino[2,3-d]pyridazine; pyridazino[4,5-d]pyridazine; pyrimido[4,5-c]pyridazine; pyrazino[2,3-c]pyridazine; pyrido[3,2-d]-as-triazine; pyrimido[4,5-e]-as-triazine; and pyrido[2,3-e]-as-triazine; as-triazino[6,5-d]-as-triazine; and mixtures of these diradicals.

6. The electrochromic device according to claim 5 wherein said counter electrode is Pt, Au, Ag/Ag halide.

7. The electrochromic device according to claim 5 wherein the solvent of the electrolyte solution is selected from the group consisting of acetonitrile; polypropylene carbonate; tetrahydrofuran; propionitrile; butyronitrile; phenylacetonitrile; dimethylformamide; dimethoxyethane; dimethylsulfoxide; pyridine; or mixtures thereof.

8. The electrochromic device according to claim 7 wherein the supporting electrolyte dissolved in the solvent is a salt selected from the group consisting of a cation-anion pair wherein the cations are selected from the group consisting of $Li^+$, $Na^+$, $K^+$, $Cs^+$, $Mg^{++}$, $(CH_3)_4N^+$, $(C_2H_5)_4N^+$, $(C_3H_7)_4N^+$, or $(C_4H_9)_4N^+$, and the anions are selected from the group consisting of $F^-$, $Cl^-$, $Br^-$, $I^-$, $ClO_4^-$, $BF_4^-$, $PF_6^-$, $AsF_6^-$, or $NO_3^-$.

9. The electrochromic device according to claim 8 wherein said polymer is a polymer comprising diradical units of the positional diradicals of quinoline, isoquinoline, quinoxaline, said diradicals interspersed with connecting units, substituted derivatives thereof, or mixtures thereof.

10. The electrochromic device according to claim 9 wherein the polymer is selected from the group consisting of

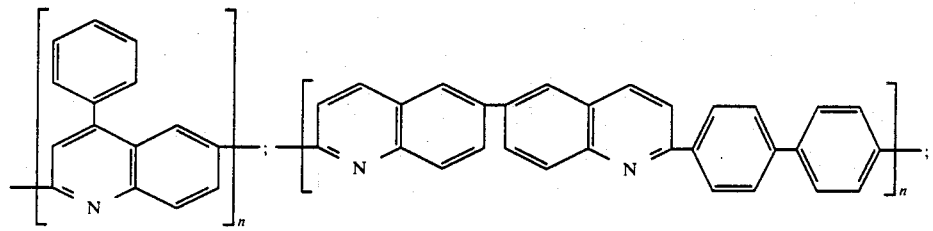

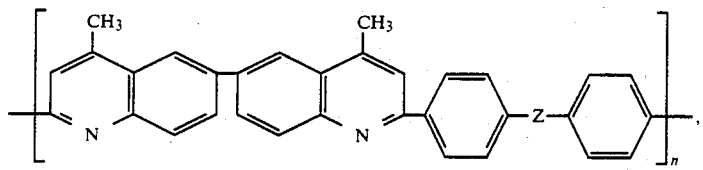

wherein Z is a connecting unit or nothing;

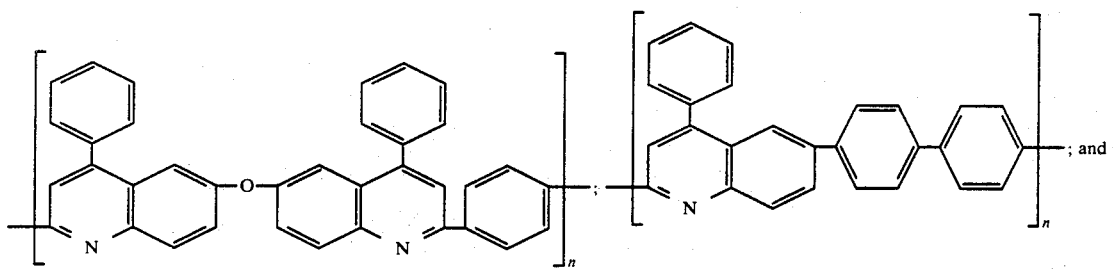

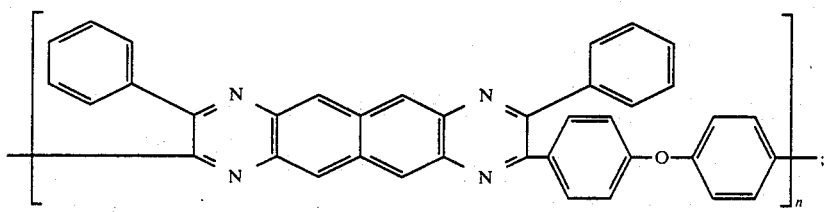

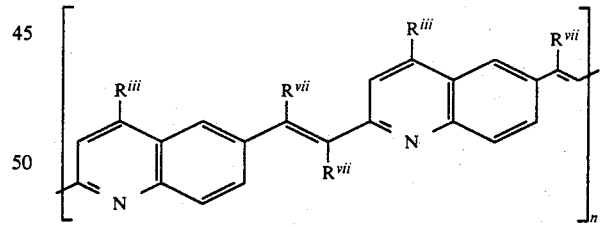

wherein n is the degree of polymerization.

11. The electrochromic device according to claim 9 wherein $R^{iii}$ is a substituent group selected from H, alkyl of 1 to 4 carbons, alkoxy of 1 to 4 carbon atoms, an alkylthio of 1 to 4 carbon atoms, a cycloaliphatic group of 5 or 6 carbon atoms, an alkenyl group of 2 to 4 carbon atoms, an aryl group of 6 to 10 carbon atoms, an aryl group of 6 to 10 carbon atoms substituted by 1 to 3 alkyl groups of 1 to 4 carbon atoms, alkenyl groups to 1 to 4 carbon atoms, alkynyl groups of 1 to 4 carbon atoms, alkoxy groups of 1 to 4 carbon atoms, 1 to 3 cyano groups, 1 to 3 halogen atoms, dialkyl amino groups of 1 to 4 carbon atoms, an alkylthiol of 1 to 4 carbon atoms, a 5- or 6-member, nitrogen-containing, unsaturated heterocyclic group; $R^{vii}$ is H or $CH_3$; and the display polymer has the following formula:

12. The electrochromic device according to claim 8 wherein the polymer is selected from the group consisting of poly-2,2'-(p-phenylene)-1,1'-dimethyl-5,5'-bibenzimidazole; poly-2,2'-(p-phenylene)-5,5'-bibenzoxazole; poly-2,2'-(p-phenylene)-5,5'-bibenzothiazole; poly-2,6-(p-phenylene)-benzo[1,2-d:5,4-d']bisoxazole; poly-2,6-(p-phenylene)-1,7-dimethyl-benzo[1,2-d:4,5-d']diimidazole; poly-2,6-(p-phenylene)-benzo[1,2-d:4,5-d']bisthiazole; poly-2,6-(m-phenylene)benzo[1,2-d:4,5-d']bisthiazole; poly-1,4-phenylene-2,5-(1,3,4-oxadiazole); copolymer of oxadiazole and thiadiazole with 1,4-phenylene connecting units; copolymer of oxadiazole and thiadiazole; poly-1,4-phenylene-2,5-(1,3,4-thiadiazole); poly-1,4-phenylene-2,4-(1,3-thiazole); poly-1,4-phenylene-2,5-(1-phenyl-1,3,4-triazole); poly- 1,4-phenylene-2,5-(1,4-dithiin); poly-2,6-(4-phenylquinoline); poly-2,6-(4-phenylquinoline) plus a connecting unit; poly-2,2'-(m-phenylene)-6,6'-bibenzoxazole; poly-2,2'-(m-phenylene)-1,1'-diemthyl-6,6'-bibenzimidazole; poly-2,2'-(m-phenylene)-6,6'-bibenzothiazole; poly-2,2'-(N-methyl-p,p'-aminodiphenylene)-6,6'-bibenzoxazole; poly-2,5-phenoxazine; poly-2,5'-(3,7-dimethyl)phenoxazine; poly-2,5-(1,4-phenylene)-phenoxazine; poly-3,7-(N-methylphenothiazine)-2,5-(1,3,4-oxadiazole); poly 3,7-(phenoxathiin-4,4' dithiobiphenylene; poly-(1,4-dithiophenylene-2,6-thianthrene); poly-4,4'-N-methyl-aminodiphenylene-2,5-(1,3,4-oxidiazole); poly-2,2'-(p-phenylene)-6,6'-bibenzoxazole; poly-2,2'-(p-phenylene)-6,6'-bibenzothiazole; poly-2,2'-(p-phenylene)-1,1'-dimethyl-6,6'-bibenzimidazole.

13. The electrochromic device according to claim 8 wherein said means for applying a current and voltage biases the display electrode to reducing conditions and the display polymer is selected from the group consisting of poly-2,2'-(p-phenylene)-1,1'-dimethyl-5,5'-bibenzimidazole; poly-2,2'-(p-phenylene)-5,5'-bibenzoxazole; poly-2,2'-(p-phenylene)-5,5'-bibenzothiazole; poly-2,6-(p-phenylene)-benzo[1,2-d:5,4d']bisoxazole; poly2,6-(p-phenylene)-1,7-dimethyl-benzo[1,2-d:4,5d']diimidazole; poly-2,6-(p-phenylene)-benzo[1,2-d:4,5d']bisthiazole; poly-2,6-(m-phenylene)benzo[1,2-d:4,5-d']bisthiazole; poly-1,4-phenylene-2,5-(1,3,4-oxadiazole); copolymer of oxadiazole and thiadiazole with 1,4 phenylene connecting units; copolymer of oxadiazole and thiadiazole; poly-1,4-phenylene-2,5-(1,3,4-thiadiazole); poly-1,4-phenylene-2,4-(1,3-thiazole); poly-1,4-phenylene-2,5-(1-phenyl-1,3,4-triazole); poly-1,4-phenylene-2,5-(1,4-dithiin); poly-2,6-(4-phenylquinoline); poly-2,6-(4-phenylquinoline) plus a connecting unit; poly-2,6-[4-(4'-chlorophenyl)quinoline]; and poly-2,6-[4-(4'-methoxyphenyl)-quinoline].

14. The electrochromic device according to claim 8 wherein said means for applying a current and voltage biases the display electrode to oxidizing conditions and said display polymer is selected from the group consisting of poly-2,2'-(m-phenylene)-6,6'-bibenzoxazole; poly-2,2'-(m-phenylene)-1,1'-dimethyl-6,6'-bibenzimidazole; poly-2,2'-(m-phenylene)-6,6'-bibenzothiazole; poly-2,2'-(N-methyl-p,p'-aminodiphenylene)-6,6'-bibenzoxazole; poly-2,5-phenoxazine; poly-2,5'-(3,7-dimethyl)phenoxazine; poly-2,5-(1,4-phenylene)-phenoxazine; poly-3,7-(N-methylphenothiazine)-2,5-(1,3,4-oxadiazole); poly-3,7-(phenoxathiin-4,4'-dithiobiphenylene; poly-(1,4-dithiophenylene-2,6-thianthrene); and poly-4,4'-N-methylaminodiphenylene-2,5-(1,3,4-oxadiazole).

15. The electrochromic device according to claim 8 wherein the display polymer is a polymer selected from the group consisting of poly-2,2'-(m-phenylene)-6,6'-bibenzoxazole; poly-2,2'-(m-phenylene)-1,1'-dimethyl-6,6'-bibenzimidazole; poly-2,2'-(m-phenylene)-6,6'-bibenzothiazole; poly-2,2'-(N-methyl-p,p'-aminodiphenylene)-6,6'-bibenzoxazole; poly-2,5-phenoxazine; poly-2,5'-(3,7-dimethyl)phenoxazine; poly-2,5-(1,4-phenylene)phenoxazine; poly-3,7-(N-methylphenothiazine)-2,5-(1,3,4-oxadiazole; poly-3,7-)phenoxathiin-4,4'-dithiobiphenylene; poly-(1,4-dithiophenylene-2,6-thianthrene); poly-4,4'-N-methylaminodiphenylene-2,5-(1,3,4-oxadiazole); poly-2,2'-(p-phenylene)-6,6'-bibenzoxazole; poly-2,2'-(p-phenylene)-6,6'-bibenzothiazole; and poly-2,2'-(p-phenylene)-1,1'-dimethyl-6,6'-bibenzimidazole.

16. The electrochromic device according to claim 8 wherein the display electrode and counter electrode contain display polymers.

17. The electrochromic device according to claim 16 wherein the display polymers are reversible n-type and p-type display polymers selected from the group consisting of poly-2,2'-(p-phenylene)-6,6'-bibenzoxazole; poly-2,2'-(p-phenylene)-6,6'-bibenzothiazole; and poly-2,2'-(p-phenylene)-1,1'-dimethyl-6,6'-bibenzimidazole.

18. The electrochromic device according to claim 8 wherein the display polymer in its colored form and associated with compensating ionic dopants has the formula:

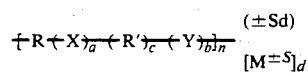

wherein a is 0 or 1; b is 0 or 1; c is 0 or 1; n is an integer from 2 to 2000; d is an integer from 1 to 4000; S is an integer 1, 2, or 3; R is a diradical of unsaturated heterocyclic ring system containing at least one Group 5B or 6B heteroatom, wherein none of the ring carbon atoms are saturated; R' is the same diradical as R or a different diradical unsaturated heterocyclic ring system; X is a diradical connecting unit; Y is the same diradical connecting unit as X or a different diradical connecting unit; and M is a charge-compensating ionic dopant of opposite electrical charge to the charge of the polymer backbone wherein the polymer backbone is capable of undergoing reversible oxidation or reversible reduction or both to form said linear charged polymer backbone, said diradical or diradical-connecting unit in the form of a monomeric repeat unit is capable of undergoing reversible oxidation or reversible reduction or both to form a stable ionic species, and wherein R and R', contain no exocyclic double bonds, and wherein said connecting unit is a conjugated system or atom or group of atoms which maintain π-orbital overlap with the heterocyclic ring system.

19. The electrochromic device according to claim 18 wherein said means for applying a current and voltage produces at least two separate colors in the display polymer during the write cycle.

20. The electrochromic device according to claim 9 wherein the counter electrode comprises silver coated with silver halide and the display electrode comprises poly-2,6-(4-phenylquinoline).

21. The electrochromic device according to claim 1 wherein said display polymer film is a polymer having the formula:

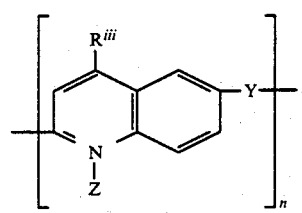

wherein Y is a connecting unit, Z is nothing or an alkyl $C_1$–$C_4$ group, $R^{iii}$ is a substituent group selected from H, alkyl of 1 to 4 carbon atoms, alkoxy of 1 to 4 carbon atoms, an alkylthio of 1 to 4 carbon atoms, a cycloaliphatic group of 5 or 6 carbon atoms, a 5- or 6-member, nitrogen-containing, unsaturated heterocyclic group, an aryl group of 6 to 10 carbon atoms wherein said aryl gruop is substituted by 1 to 3 alkyl groups of 1 to 4 carbon atoms, alkenyl groups of 1 to 4 carbon atoms, alkynyl groups of 1 to 4 carbon atoms, alkoxy groups of 1 to 4 carbon atoms, 1 to 3 cyano groups, 1 to 3 halogen atoms, dialkyl amino groups of 1 to 4 carbon atoms, or an alkylthiol of 1 to 4 carbon atoms; and n is the degree of film forming polymerization.

* * * * *

UNITED STATES PATENT AND TRADEMARK OFFICE
CERTIFICATE OF CORRECTION

PATENT NO. : 4,613,211
DATED : September 23, 1986
INVENTOR(S) : Y.S. PAPIR ETAL.

It is certified that error appears in the above-identified patent and that said Letters Patent are hereby corrected as shown below:

Col. 15, line, Line 40, 4th formula,:

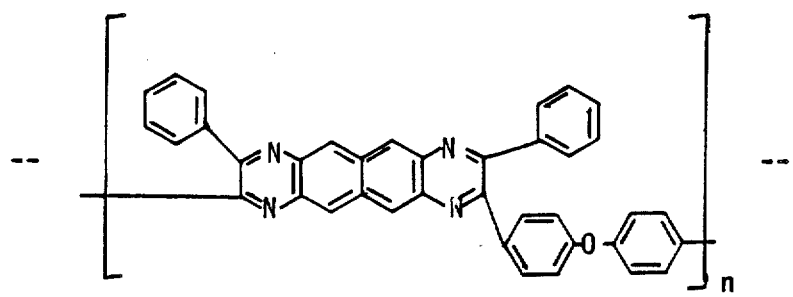

UNITED STATES PATENT AND TRADEMARK OFFICE
CERTIFICATE OF CORRECTION

PATENT NO. : 4,613,211
DATED : September 23, 1986
INVENTOR(S) : Y.S. PAPIR ET AL.

It is certified that error appears in the above-identified patent and that said Letters Patent is hereby corrected as shown below:

should read:

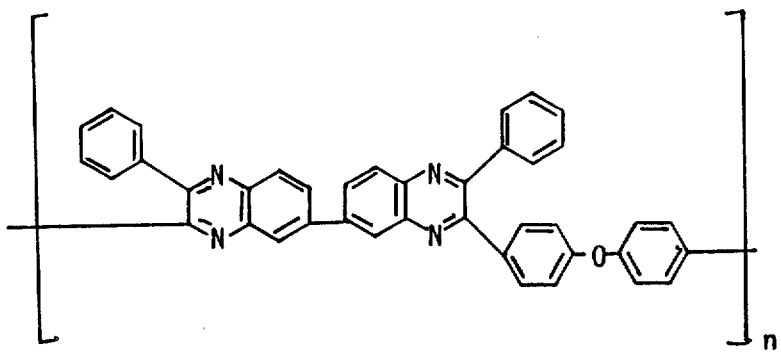

Signed and Sealed this

Sixth Day of October, 1987

Attest:

Attesting Officer

DONALD J. QUIGG

Commissioner of Patents and Trademarks